(12) United States Patent
Barbotin et al.

(10) Patent No.: US 6,569,799 B1
(45) Date of Patent: May 27, 2003

(54) CATALYTIC SYSTEM, ITS METHOD FOR PREPARATION, AND METHOD FOR PREPARATION OF A COPOLYMER OF ETHYLENE AND A CONJUGATED DIENE

(75) Inventors: Fanny Barbotin, Riom (FR); Cristophe Boisson, Villeurbanne (FR); Roger Spitz, Lyons (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/689,464

(22) Filed: Oct. 12, 2000

(30) Foreign Application Priority Data

Oct. 12, 1999 (FR) .............................. 99 12798

(51) Int. Cl.$^7$ .............................. B01J 31/22; C08F 4/44
(52) U.S. Cl. ...................... 502/152; 556/53; 526/124.2; 526/127; 526/160; 526/164
(58) Field of Search ............................ 556/53; 502/152; 526/160, 161, 221, 123.1, 164, 124.2, 124.3, 127

(56) References Cited

U.S. PATENT DOCUMENTS

| | | |
|---|---|---|
| 4,716,257 A | 12/1987 | Marks et al. |
| 4,801,666 A | 1/1989 | Marks et al. |
| 5,109,085 A | 4/1992 | Pettijohn et al. |

OTHER PUBLICATIONS

Changtao et al., Journal of Organometallic Chemistry, vol. 525, issue 1–2, pp. 22–30, date: Nov. 15, 1996 (Abstract).*
Ballard et al., J. Chem. Soc., Chem. Comm. pp 994–995, 1978.
Cui, Li Qiang et al: "Prelominary investigations on polymerization catalysts composed of lanthanocene and methyl aluminoxane" Polym. Bull. (Berlin) (1998), 40(6), 729–734, XP000755393.
Hu Jing–Yu et al.: "Study on the Polymerization of Isoprene Catalyzed by Neutral Arene Organolanthanoids–Air$_3$ System" Chinese Science Bulletin (vol. 37, No. 7) (Apr. 1992), pp 566–570.
Hongze Liang et al.: "A New Method for the synthesis of Ln($\eta^6$–C$_6$Me$_6$) (AlCl$_4$)$_3$(Ln=Nd, Sm, Gd, Yb), and the X–ray crystal structure of Yb($\eta^6$–C$_6$Me$_6$) (AlCl$_4$)$_3$–MeC$_6$H$_5$" Journal of Organometallic Chemistry 474 (1994) pp. 113–116.
Paolo Biagini et al.: Alkylation of lanthanide ($\eta^6$–arene)–tetrahalogenoaluminates: Synthesis and catalytic activity of Ln ($\eta^6$–arene) (AIX$_3$R)$_3$ derivatives. Molecular structure of Nd($\eta^6$–C$_6$H$_5$Me) (AlCl$_3$ME), New J. Chem., 1995, 19, pp. 713–722.

\* cited by examiner

*Primary Examiner*—Robert D. Harlan
(74) *Attorney, Agent, or Firm*—Baker Botts L.L.P.

(57) ABSTRACT

The present invention provides to a catalytic system, its method for preparation, and a method for preparation of a copolymer of ethylene and a conjugated diene, which uses this catalytic system. A catalytic system according to the invention comprises:

an organometallic complex compound, which is represented by one formula A or B:

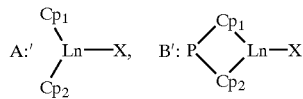

in which Ln represents a metal of a lanthanide, the atomic number of which is between 57 and 71;
X represents a halogen, which can be chlorine, fluorine, bromine or iodine; and
Cp$_1$ and Cp$_2$ each comprise a cyclopentadienyl or fluorenyl group, which is or is not substituted, and
P is a bridge corresponding to the formula MR$_2$, in which M is an element of column IVA of Mendeleev's periodic classification, and R is an alkyl group comprising from 1 to 20 atoms of carbon; and
a co-catalyst selected from among a magnesium alkyl, a lithium alkyl, an aluminium alkyl, or a Grignard's reagent, and mixtures thereof.

12 Claims, No Drawings

CATALYTIC SYSTEM, ITS METHOD FOR PREPARATION, AND METHOD FOR PREPARATION OF A COPOLYMER OF ETHYLENE AND A CONJUGATED DIENE

BACKGROUND OF THE INVENTION

The present invention relates to a catalytic system which can be used for copolymerization of ethylene and a conjugated diene monomer, a method for preparation of this catalytic system, and a method for preparation of a copolymer of ethylene and a conjugated diene monomer, using the catalytic system.

It is known that ethylene may be polymerized using certain complex compounds based on lanthanides. These catalysts can be used over a wide range of pressures and temperatures, advantageously at a reduced pressure and a temperature which is close to ambient temperature, for the polymerization of ethylene.

The first complex compounds based on lanthanides described in the literature were alkylated complex compounds. In particular, in J. Chem. Soc., Chem. Comm. pp 994–995 (1978), Ballard et al. described the polymerization of ethylene by means of a complex compound corresponding to the formula $[(C_5H_5)_2ErMe]_2$ (in which Me is a methyl group).

These alkylated complex compounds can achieve instantaneous levels of activity which are very high, as described in U.S. Pat. No. 4,716,257, with reference to a similar complex compound corresponding to the formula $[(C_5Me_5)_2LnH]_2$ (in which Ln represents a lanthanide).

However, a major disadvantage of these alkylated complex compounds is that they are deactivated very quickly. Another disadvantage consists in the relative complexity of their synthesis.

In order to eliminate these disadvantages, there have been attempts to develop non-alkylated complex compounds which are based on lanthanides. These complex compounds have a metal-halogen bond and are alkylated in the polymerization medium. U.S. Pat. No. 5,109,085 describes the polymerization of ethylene with complex compounds having the formula $C_{pn}LnX_{4-n}M'Lx$ (in which L is a complexing molecule, and x is a whole number equivalent to, or higher than 1), which have one or more co-catalysts added to them. The patent also refers to the possible use of the complex for copolymerizing ethylene and butadiene.

This type of non-alkylated complex compound has in its environment one or more complexing molecules L, which for example can consist of tetrahydrofurane or diethylic ether, and are added for reasons of organometallic synthesis. However, it is found that these complexing molecules can compete with the ethylenic monomer during complexing on the lanthanide, with the undesirable consequence of limiting catalytic activity and, thus, the polymerization output.

In addition, Cui, Li Qiang et al: "Preliminary investigations on polymerization catalysts composed of lanthanocene and methyl aluminoxane", Polymer Bulletin (Berlin), 1998, 40(6), pp 729–734, describe a catalytic system which is designed for homopolymerization of isoprene, butadiene, or styrene. This catalytic system comprises:

a rare earth organometallic complex compound in accordance with one or another of the following formula:

$(C_5H_9Cp)_2NdCl$ (I);

$(C_5H_9Cp)_2SmCl$ (II);

$(MeCp)_2SmOAr'$ (III);

$(Ind)_2NdCl$ (IV);

$Me_2Si(Ind)_2NdCl$ (V);

$(Flu)_2NdCl$ (VI);

in which Cp, Ind and Flu are respectively cyclopentadienyl, indenyl and fluorenyl groups, and OAr' is a phenoxy group; and a co-catalyst consisting of methylaluminoxane, tested in comparison with a co-catalyst consisting of an aluminium alkyl.

The present invention provides an improved catalytic system for preparing copolymers of ethylene and a conjugated diene which do not have the aforementioned disadvantages of the art.

SUMMARY OF THE INVENTION

The present invention provides a catalytic system for copolymerizing ethylene and a conjugated diene comprising an organometallic complex compound represented by one of the following generic formula A' or B':

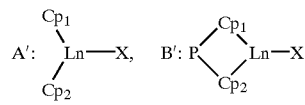

in which Ln represents a metal of a lanthanide, the atomic number of which is between 57 and 71;

X represents a halogen, selected from among chlorine, fluorine, bromine and iodine; wherein in formula A', two ligand molecules $Cp_1$ and $Cp_2$, which may be identical or different, selected from a substituted or unsubstituted cyclopentadienyl and fluorenyl group are bonded to metal Ln; and in formula B', a ligand comprising $Cp_1$ and $Cp_2$ bonded to each other by a bridge P is bonded to metal Ln, wherein $Cp_1$ and $Cp_2$ comprise a substituted or unsubstituted cyclopentadienyl or fluorenyl group, bridge P corresponds to the formula $MR_2$, in which M is silicon or another element of column IVA of Mendeleev's periodic classification and R is an alkyl group having 1 to 20 atoms of carbon;

and a co-catalyst selected from the group consisting of a magnesium alkyl, a lithium alkyl, an aluminum alkyl, a Grignard's reagent and mixtures thereof.

In a preferred embodiment metal, Ln is neodymium. $Cp_1$ and $Cp_2$ are preferably identical, each being a cyclopentadienyl group. More preferably, $Cp_1$ and $Cp_2$ are each a cyclopentadienyl group, substituted by an alkyl radical or a silyl alkyl radical.

The invention also provides for methods for preparing the catalytic system and its use thereof in preparing copolymers of ethylene and a conjugated diene.

DETAILED DESCRIPTION OF THE INVENTION

The present invention provides an improved catalytic system for preparing copolymers of ethylene and a conjugated diene which do not have the aforementioned disadvantages of the art. The present invention provides a catalytic system for copolymerizing ethylene and a conjugated diene comprising an organometallic complex compound represented by one of the following generic formula A' or B':

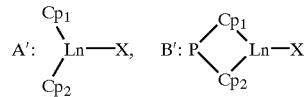

in which Ln represents a metal of a lanthanide, the atomic number of which can be between 57 and 71;

X represents a halogen, selected from among chlorine, fluorine, bromine and iodine; wherein in formula A', two ligand molecules $Cp_1$ and $Cp_2$, which may be identical or different, selected from a substituted or unsubstituted cyclopentadienyl and fluorenyl group are bonded to metal Ln; and in formula B', a ligand comprising $Cp_1$ and $Cp_2$ bonded to each other by a bridge P, is bonded to metal Ln, wherein $Cp_1$ and $Cp_2$ comprise a substituted or unsubstituted cyclopentadienyl or fluorenyl group, bridge P corresponds to the formula $MR_2$, in which M is silicon or another element of column IVA of Mendeleev's periodic classification and R is an alkyl group having 1 to 20 atoms of carbon;

and a co-catalyst selected from the group consisting of a magnesium alkyl, a lithium alkyl, an aluminum alkyl, a Grignard's reagent and mixtures thereof.

In a preferred embodiment, Ln is neodymium $Cp_1$ and $Cp_2$ are preferably identical, each being a cyclopentadienyl group. More preferably, $Cp_1$ and $Cp_2$ are each a cyclopentadienyl group, substituted by an alkyl radical or a silyl alkyl radical.

Thus, in one aspect, the catalytic system of the invention comprises an organometallic complex compound, which is represented by one of formula A' or B':

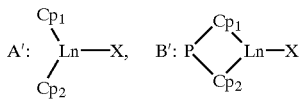

in which Ln represents a metal of a lanthanide, the atomic number of which is between 57 and 71;

X represents a halogen selected from among chlorine, fluorine, bromine and iodine; wherein in formula A, two ligand molecules $CP_A$, each a substituted cyclopentadienyl group, are bonded to metal Ln;

and in formula B, a ligand, comprising two $Cp_B$, bonded to one another by a bridge P are bonded to metal Ln, wherein $Cp_B$ is a substituted or unsubstituted cyclopentadienyl or fluorenyl group and P corresponds to formula $MR_2$, in which M is an element in column IVA of Mendeleev's periodic classification, and R is an alkyl group having 1 to 20 carbon atoms; and a co-catalyst selected from the group consisting of a magnesium alkyl, a lithium alkyl, an aluminium alkyl, a Grignard's reagent, and mixtures thereof.

In the case of substitution by a silyl alkyl radical, $Cp_1$ and $Cp_2$ each correspond to formula $Cp_A=(C_5H_4)(SiMe_3)$ in generic formula A', or to formula $Cp_B=(C_5H_3)(SiMe_3)$ in generic formula B', where Me represents a methyl group. The organometallic complex compound then corresponds to particular formula A or B hereinafter, as applicable.

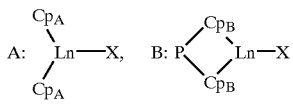

In particular formula A, two molecules of $Cp_A$, each of which corresponds to formula $(C_5H_4)(SiMe_3)$ are bonded to metal Ln, and in particular formula B, a ligand molecule, comprising two molecules of $Cp_B$, each a substituted cyclopentadienyl group corresponding to the formula $(C_5H_3)(SiMe_3)$, bonded to each other by bridge P, is bonded to metal Ln.

In a further embodiment, $Cp_1$ and $Cp_2$ are identical, each comprising a non-substituted fluorenyl group which corresponds to formula $C_{13}H_9$, in generic formula A', or which corresponds to the formula $C_{13}H_8$, for the said generic formula B'. In the latter case, there corresponds to the formula B' the aforementioned particular formula B, in which $Cp_B=C_{13}H_8$.

If $Cp_1=Cp_2=Cp$, said organometallic complex compound is prepared as follows:

(a) preparing a hydrogenated molecule of ligand, represented by the formula HCp, which is reacted with a lithium alkyl to obtain a lithium salt;

(b) reacting the lithium salt in a complexing solvent with an anhydrous lanthanide trihalide, represented by formula $LnX_3$, where X represents a halogen selected from among chlorine, fluorine, bromine and iodine to produce a reaction product;

(c) evaporating the complexing solvent, and extracting in a non-complexing solvent the reaction product of (b) to produce an extracted reaction product; and, optionally:

(d) crystallizing the extracted reaction product of (c), in order to obtain the organometallic complex compound which corresponds to formula A or B, which are completely free from the complexing solvent.

In step (a), lithium butyl is the preferred lithium alkyl.

In step (b), tetrahydrofurane (THF) is the preferred complexing solvent. In addition, two moles of the lithium salt are advantageously reacted with one or two moles of the lanthanide trihalide.

Toluene or heptane are preferred non-complexing solvents in step (c).

When the co-catalyst is a mixture of an aluminium alkyl and a lithium alkyl, these two components are advantageously present in quantities which are stoichiometric, or close to the stoichiometry in the mixture, in order to obtain satisfactory catalytic activity.

Preferred co-catalysts include magnesium butyloctyl, lithium butyl, aluminium diisobutyl hydride, magnesium butyl chloride and mixtures thereof.

In accordance with the invention, copolymers of ethylene and a conjugated diene are prepared by reacting the catalytic system comprising the organometallic complex compound and the co-catalyst with ethylene and a conjugated diene monomer in an inert hydrocarbon solvent.

Suitable conjugated dienes include 1,3-butadiene, 2-methyl 1,3-butadiene (hereinafter referred to as butadiene and isoprene, respectively), 2,3-di (C1 to C5 alkyl) 1,3-butadienes, such as 2,3 dimethyl-1,3 butadiene, 2,3-diethyl-1,3-butadiene, 2-methyl 3-ethyl 1,3-butadiene, 2-methyl 3-isopropyl 1,3-butadiene, phenyl 1,3-butadiene, 1,3-pentadiene, 2,4-hexadiene, and any other conjugated diene having has between 4 and 8 carbon atoms.

The polymerization reaction can be carried out in suspension or in solution, at a variable pressure, and at a temperature of between −20° C. and 220° C., preferably between 20° C. 90° C.

The molar ratio of co-catalyst to organometallic complex compound is 1 or more, preferably 2 to 100.

The concentration of lanthanide in the reaction medium is advantageously lower than 0.3 mmole/l.

The molar fraction of butadiene in the reaction medium is advantageously between 1% and 80%.

With reference to Appendix I below, the copolymer of ethylene and a conjugated diene produced by the method of the invention can have the following microstructure characteristics, according to the organometallic complex compound used for the catalytic system.

If butadiene is the conjugated diene, the copolymer obtained can have the following chain formations for the butadiene units inserted in the copolymer:
1,4 cis; 1,4 trans; 1,2, or it can be in the form of trans 1,2 cyclohexane. (See Appendix I).

More particularly, when the organometallic complex compound corresponds to one of formulae $[(C_5H_4)SiMe_3]_2$ NdCl, $\{[(C_5H_3)SiMe_3]SiMe_2\}$NdCl or $(C_{13}H_9)_2$NdCl, most of the butadiene in the copolymer will comprise 1,4 trans chain formations.

When the complex compound corresponds to the formula $[(C_{13}H_8)_2SiMe_2]$NdCl, most of the butadiene in the copolymer chain will have a 1,2 trans cyclohexane configuration.

If isoprene is the conjugated diene, the copolymer obtained can have the following chain formations for the isoprene units inserted in the copolymer:
1,4; 1,2 or 3,4.

More particularly, when the organometallic complex compound corresponds to formula $[(C_5H_4)SiMe_3]_2$NdCl, most of the isoprene is inserted in the copolymer chain by 1,4 bonds chain formations.

When the complex compound corresponds to formula $[(C_{13}H_8)_2SiMe_2]$NdCl, most of the isoprene inserted in the copolymer by 3,4 chain formations.

A further characteristic of the ethylene and butadiene copolymers obtained by the method of the invention, is that they have an "ethylene-butadiene" chain formation statistic which is substantially of the alternating type, when the organometallic complex compound corresponds to Lima formula $[(C_5H_4)SiMe_3]_2$NdCl or formula $\{[(C_5H_3)SiMe_3]_2$ $SiMe_2\}$NdCl, and a chain formation statistic that is substantially of the block type, when the complex compound corresponds to formula $(C_{13}H_9)_2$NdCl. (See Appendix II below).

The aforementioned characteristics of the present invention, as well as others, will be better understood in view of the above description and the following non-limiting Examples 1–4 of embodiments of the invention compared to Example 5, which illustrates the prior state of the art.

For all of the following examples, the work was carried out using argon, and the solvents used were previously dried by distillation or on a 3 Å molecular sieve swept with argon.

The microstructure of the copolymers obtained in the examples was determined first by of RMN$^1$H techniques, and second by the RMN$^{13}$C technique. For this purpose, a spectrometer sold under the name "BRUKER" was used, at frequencies of 400 MHz for the RMN$^1$H technique, and 100.6 MHz for the RMN$^{13}$C technique.

Appendix I describes the method for determining of this microstructure.

Appendix II describes the method for determining "ethylene-butadiene" chain formation statistic.

EXAMPLE 1

Catalytic System Comprising a Neutral, Non-bridged Organometallic Complex Compound: Chloro bis(η5-Trimethylsilylcyclopentadienyl) neodymium, Corresponding to Formula $[(C_5H_4)SiMe_3]_2$NdCl (Generic Formula A')

Synthesis of a Salt Having the Formula Li$[(C_5H_4)SiMe_3]$:
A compound of formula $(C_5H_5)SiMe_3$ and 80 ml of dry heptane are introduced into a 20 mmole Schlenk tube. 20 mmoles of lithium butyl is then added gradually at ambient temperature. The solution obtained is agitated for three hours at ambient temperature until the emission of gas ceases. A white precipitate is obtained, which is filtered and washed twice with 40 ml of heptane. It is then dried under vacuum, in order to obtain the salt.

Synthesis of the Organometallic Complex Compound Having Formula $[(C_5H_4)SiMe_3]_2$NdCl:

Reflux agitation is carried out overnight of a solution of 4 mmoles of anhydrous NdCl$_3$ in tetrahydrofurane (THF). 8 mmoles of the salt having formula Li$[(C_5H_4)SiMe_3]$ is then added to this solution. Reflux agitation is then carried out on the mixture obtained in THF for 48 hours, followed by evaporation of the THF. Then 60 ml of toluene are added to the mixture. The salt present in solution is filtered, the remaining solution is concentrated, and is then crystallized at −30° C. to provide the organometallic complex compound.

Elementary centesimal analysis of this complex compound provides the following percentages for the carbon and hydrogen atoms:
% C=42.05 and % H=5.9.

The resulting organometallic complex compound was characterized by means of the RMN$^1$H technique at 300 MHz.

By means of this technique, two masses can be observed, each integral of which corresponds to 4 protons, i.e.:
a first mass with 26.55 ppm is representative of the protons of C$_5$H$_4$ which are bonded to the first cyclopentadienyl group of this complex compound, and a second mass with 11.4 ppm is representative of the C$_5$H$_4$ protons which are bonded to the second cyclopentadienyl group.

Finally, a mass is observed with −12.38 ppm, the integral of which corresponds to 18 protons, which is representative of the protons of the two substituents Si(CH$_3$)$_3$ of the complex.

Method for Copolymerization of Ethylene and Butadiene:

Four tests are carried out, each of which corresponds to a single introduction into a reactor containing approximately 300 ml of toluene, of a pre-determined quantity x (mg) of the organometallic complex compound having formula $[(C_5H_4)SiMe_3]_2$NdCl, a mixture of ethylene and butadiene with a pre-determined molar fraction y (%) of butadiene, and a co-catalyst. The temperature in the reactor is raised to 80° C.

When the fraction y of butadiene permits it, the pressure inside the reactor is maintained at a constant value, equivalent to 4 bars.

After a time t, the polymerization is halted by cooling and de-gassing of the reactor, thereafter the polymer obtained is precipitated in methanol. After drying has been carried out, a mass m of polymer is obtained.

For each of the first three tests, the co-catalyst comprises a mixture of lithium butyl and aluminium diisobutyl hydride (hereinafter, BuLi and HDiBA, respectively), in the following molar proportions:

BuLi/HDiBA/neodymium=10/10/1.

For the fourth test, the co-catalyst comprises magnesium butyloctyl (hereinafter BOMAG), in a molar proportion of 20/1 relative to neodymium.

Table I below shows the operative conditions and the results obtained for the above-described four tests.

TABLE I

| tests | x (mg) | y (%) in monomer mixture | % butadiene in the copolymer | stereochemistry of insertion of the butadiene in the copolymer | | | co-catalyst | t (min) | m (g) |
| --- | --- | --- | --- | --- | --- | --- | --- | --- | --- |
| | | | | % 1,2 | % 1,4 trans | % trans 1,2 cyclohexane | | | |
| n° 1 | 29 | 0 | 0 | — | — | — | BuLi + HDiBA | 30 | 20 |
| n° 2 | 32 | 3.9 | 3.5 | 4 | 96 | 0 | BuLi + HDiBA | 80 | 3.7 |
| n° 3 | 36 | 21.2 | 16.4 | 3 | 97 | 0 | BuLi + HDiBA | 260 | 2 |
| n° 4 | 16 | 4.5 | 9.5 | 8.6 | 85.2 | 6.2 | BOMAG | 132 | 1.2 |

The "ethylene-butadiene" chain formation statistic for the copolymer obtained in test no. 3 was determined.

Using the method set forth below in Appendix II, the following was obtained for this copolymer:
- a block index η equivalent to 1.12; and
- a block index $\eta_{alternating}$ (corresponding to a perfectly alternating copolymer with the same composition) equivalent to 1.19.

It can be deduced that this copolymer has a tendency towards alternance for these chain formations.

Method for Copolymerization of Ethylene and Isoprene:

The organometallic complex compound having formula $[(C_5H_4)SiMe_3]_2NdCl$ synthesized as above is used.

Three tests are carried out, each of which corresponds to introduction into a reactor of a solution comprising 300 ml of toluene, x (mg) complex compound of formula $[(C_5H_4)SiMe_3]_2NdCl$, BuLi, HDiBA and y (ml) of isoprene.

BuLi and HDiBA are introduced in molar ratio to neodymium as follows:

BuLi/neodymium=10 and HDiBA/neodymium=10.

The temperature inside the reactor is raised to 80° C., and ethylene is added to the solution. The pressure inside the reactor is maintained constant, equivalent to 4 bars.

After a time t, the polymerization is halted by cooling and de-gassing of the reactor, then the resulting copolymer is precipitated in methanol.

Table II below shows the operative conditions and the results obtained for the above-described three tests.

ambient temperature. Part of the THF is then evaporated, and heptane is added. In succession, the solution obtained is then hydrolyzed, washed with an aqueous solution saturated with $NH_4Cl$, and dried on magnesium sulphate. The THF is then evaporated, and the product finally obtained is a viscous oil which corresponds to the aforementioned formula.

Synthesis of a Salt Having Formula $[(C_5H_3)SiMe_3]_2SiMe_2Li_2$:

14 mmole of BuLi is added gradually at 0° into a Schlenk tube which contains a solution of THF comprising 7 mmoles of the compound formula $[(C_5H_4)SiMe_3]_2SiMe_2$. The mixture is agitated together at ambient temperature for 6 hours, then the product obtained is precipitated by addition of heptane. The precipitate is then filtered, washed with heptane, and dried under vacuum to obtain the salt.

Synthesis of the Organometallic Complex Compound Having Formula $\{[(C_5H_3)SiMe_3]_2SiMe_2\}NdCl$:

Reflux agitation is carried out overnight on 4 mmoles of anhydrous $NdCl_3$ in THF. 4 mmoles of the salt of formula $[(C_5H_3)SiMe_3]_2SiMe_2Li_2$ is then added to this suspension. The mixture is then agitated, in a first stage for 4 hours at ambient temperature, then in a second stage for 24 hours with reflux in THF. The THF is evaporated, and toluene is added. The salt is filtered, then the product finally obtained after having been concentrated is crystallized at a temperature of −10° C. to obtain the organometallic complex compound.

Elementary centesimal analysis of this complex compound gives the following percentages for the atoms of carbon and hydrogen:

TABLE II

| tests | x (mg) | y (ml) | % isoprene in the copolymer | stereochemistry of insertion of the isoprene in the copolymer | | | co-catalyst | t (min) | m (g) |
| --- | --- | --- | --- | --- | --- | --- | --- | --- | --- |
| | | | | % 1,2 | % 1,4 | % 3,4 | | | |
| n° 1 | 49.5 | 1 | 0.98 | 2.3 | 89.7 | 8.0 | BuLi + HdiBA | 60 | 3.37 |
| n° 2 | 48.2 | 3 | 0.96 | 2.3 | 89.6 | 8.1 | BuLi + HdiBA | 60 | 2.42 |
| n° 3 | 45.2 | 10 | 3.8 | 1.6 | 90.9 | 7.5 | BuLi + HDiBA | 60 | 1.29 |

EXAMPLE 2

Catalytic System Comprising a Neutral, Bridged Organometallic Complex Compound: Chloro (μ-dimethylsilyl)bis(η5-trimethylsilylcyclopentadienyl) neodymium, Corresponding to Formula $\{[(C_5H_3)SiMe_3]_2SiMe_2\}NdCl$ (Generic Formula B')

Synthesis of a Compound Having Formula $[(C_5H_4)SiMe_3]_2SiMe_2$:

16 mmoles of a compound of formula $Li[(C_5H_4)SiMe_3]$, 8 mmoles of $Me_2SiCl_2$ and 80 ml of THF are introduced into a Schlenk tube. The mixture is agitated together overnight at %C=42.8 and %H=5.75.

This organometallic complex compound was characterized by means of the $RMN^1H$ technique at 300 MHz. By means of this technique, two masses can be observed, each integral of which corresponds to 3 protons, i.e.:

a first mass with 2.13 ppm and a second mass with −8.97 ppm are each representative of the protons of $Si(CH_3)_2$ in this complex compound.

Finally, a mass with −2.99 ppm is observed, the integral of which corresponds to 18 protons, which is representative of the protons in the two substituents $Si(CH_3)_3$ of the complex compound.

It will be noted that the peaks corresponding to the protons of $C_5H_3$ are not detected, probably owing to the fact that these peaks are very wide.

Method for Copolymerization:

Three tests are carried out following the procedure of Example 1, with the difference being that the compound having the formula $\{[(C_5H_3)SiMe_3]_2SiMe_2\}NdCl$ is used as the organometallic complex compound.

For each of these three tests, the co-catalyst comprises a mixture of BuLi and HDiBA, in accordance with the following molar proportions:

BuLi/HDiBA/neodymium=10/10/1.

Table III below shows the operative conditions and the results obtained for the above-described three tests.

Synthesis of the Organometallic Complex Compound Having Formula $(C_{13}H_9)_2NdCl$:

1.6 mmoles of $NdCl_3$ in THF is agitated and refluxed. The suspension obtained is cooled to ambient temperature, then 3.25 mmole of the salt of formula $C_{13}H_9Li$ is added. The mixture is agitated overnight at ambient temperature, then refluxed for 4 hours. After the THF has been evaporated, the product obtained is extracted with toluene, and recuperated from the toluene by evaporation under vacuum to obtain the organometallic complex compound.

Method for Copolymerization:

Four tests are carried out following the procedure in Example 1, with the only difference being that the compound having formula $(C_{13}H_9)_2NdCl$ is used as the organometallic complex compound.

TABLE III

| tests | x (mg) | y (%) in monomer mixture | % butadiene in the copolymer | % 1,2 | % 1,4 trans | stereochemistry of insertion of the butadiene in the copolymer % trans 1,2 cyclohexane | co-catalyst | t (min) | m (g) |
|---|---|---|---|---|---|---|---|---|---|
| n° 1 | 31 | 5.4 | 6.9 | 2 | 98 | 0 | BuLi + HDiBA | 30 | 13.5 |
| n° 2 | 30 | 43 | 41 | 2.5 | 97.5 | 0 | BuLi + HDiBA | 120 | 4.8 |
| n° 3 | 36 | 80 | 61.5 | 4.5 | 95.5 | 0 | BuLi + HDiBA | 900 | 0.5 |

The "ethylene-butadiene" chain formation statistic for the copolymer obtained in test no. 2 was determined.

Using the method set forth in Appendix II, the following was obtained for this copolymer:

a block index η equivalent to 1.69; and a block index $\eta_{alternating}$ (corresponding to a perfectly alternating copolymer with the same composition) equivalent to 1.78.

It can be deduced that this copolymer has a tendency towards alternance for these chain formations.

For the first three tests, the co-catalyst comprises a mixture of BuLi and HDiBA, in the following molar proportions:

BuLi/HDiBA/neodymium=10/10/1.

For the fourth test, the co-catalyst comprises magnesium butyloctyl, in a molar proportion of 20/1 relative to the neodymium.

Table IV below shows the operative conditions and the results obtained for the above-described four tests.

TABLE IV

| tests | x (mg) | y (%) in monomer mixture | % butadiene in the copolymer | % 1,2 | % 1,4 trans | % 1,4 cis | % trans 1,2 cyclohexane | co-catalyst | t (min) | m (g) |
|---|---|---|---|---|---|---|---|---|---|---|
| n° 1 | 24.9 | 4 | 3.6 | 8 | 82 | 0 | 10 | BuLi + HDiBA | 65 | 2.7 |
| n° 2 | 24.5 | 20 | 9.2 | 9 | 79–83 | 0 | 12–7 | BuLi + HDiBA | 120 | 1.7 |
| n° 3 | 26 | 30 | 42 | 13 | 75 | 9 | 3 | BuLi + HDiBA | 1560 | 0.8 |
| n° 4 | 24.4 | 4.5 | 4 | 6 | 87.5 | 0 | 6.5 | BOMAG | 100 | 1.2 |

EXAMPLE 3

Catalytic System Comprising a Neutral, Non-bridged Organometallic Complex Compound:

Chloro bis(η5-fluorenyl)neodymium, Corresponding to the Formula $(C_{13}H_9)_2NdCl$ (Generic Formula A')

Synthesis of a Salt Having Formula $C_{13}H_9Li$:

Thirty-nine (39) mmoles of a compound of formula $C_{13}H_{10}$ is reacted with 39 mmoles of BuLi overnight, then for 3 hours with reflux in heptane at ambient temperature. The salt obtained is washed with heptane, then is dried under vacuum to obtain the identified salt.

The "ethylenie-butadiene" chain formation statistic for the copolymer obtained in test no. 3 was obtained.

Using the method in Appendix II, the following was obtained for this copolymer:

a block index η equivalent to 0.4; and a block index $\eta_{alternating}$ (corresponding to a perfectly alternating copolymer with the same composition) equivalent to 1.7.

It can be deduced that this copolymer has a tendency towards alternance for these chain formations.

EXAMPLE 4
Catalytic System Comprising a Bridged Neutral Organometallic Complex Compound: Chloro($\mu$-dimethylsilyl)bis($\eta$5-fluorenyl)neodymium, Corresponding to the Formula [$(C_{13}H_8)_2SiMe_2$] NdCl (Generic Formula B')

Synthesis of a Compound Having Formula $Me_2Si(C_{13}H_9)_2$:

Reflux agitation of 18 mmoles of $C_{13}H_{10}$ and 18 mmoles of sodium hydride is carried out overnight in THF. 8.1 MMoles of $Cl_2SiMe_2$ is then added to this mixture, then the solution obtained is agitated for 3 hours at ambient temperature. Following evaporation of some of the THF, heptane is added. The organic phase obtained is hydrolyzed and extracted several times by an aqueous solution saturated with $NH_4Cl$. The solvent is then evaporated and, after the extract has been dried under vacuum at 60° C., the compound corresponding to the above formula is obtained.

Synthesis of a Salt Having Formula $Me_2Si(C_{13}H_8)_2Li_2$:

4.4 mmoles of the compound of formula $Me_2Si(C_{13}H_9)_2$ and 13 mmoles of BuLi are agitated overnight at ambient temperature in toluene, and then for 3 hours at 50° C. A precipitate is obtained comprising a salt which corresponds to the above formula, which is washed with heptane, then dried under vacuum.

Synthesis of the Orpanometallic Complex Compound Having Formula [$(C_{13}H_8)_2SiMe_2$]NdCl]:

2 mmoles of $NdCl_3$ is agitated with reflux overnight in THF. 2.1 moles of the salt are added at 0° C., then the mixture is heated with reflux for 22 hours. The THF is then evaporated, and the organometallic complex compound is recuperated by extraction with toluene, followed by evaporation of the latter.

Method for Copolymerization of the Ethylene and Butadiene:

Five tests are carried out in accordance with Example 1, with the difference being that the compound having formula [$(C_{13}H_8)SiMe_2$]NdCl is used as the organometallic complex compound.

For the first two tests, the co-catalyst comprises a mixture of BuLi and HDiBA, in the following molar proportions: BuLi/HDiBA/neodymium=10/10/1.

For the third and fourth tests, the co-catalyst comprises magnesium butyl chloride, in a molar proportion of 20/1 relative to the neodymium.

For the fifth test, the co-catalyst comprises of BuLi, in a molar proportion of 2/1 relative to the neodymium.

Table V below shows the operative conditions and the results obtained for the above-described five tests.

TABLE V

| tests | x (mg) | y (%) in monomer mixture | % butadiene in the copolymer | stereochemistry of insertion of the butadiene in the copolymer | | | co-catalyst | t (min) | m (g) |
|---|---|---|---|---|---|---|---|---|---|
| | | | | % 1,2 | % 1,4 trans | % trans 1,2 cyclohexane | | | |
| n° 1 | 21.3 | 5 | 4 | 18 | 23 | 58 | BuLi + HDiBA | 70 | 9.9 |
| n° 2 | 25.8 | 20 | 10.2 | 23.5 | 28.5 | 48 | BuLi + HDiBA | 135 | 3 |
| n° 3 | 18.9 | 5 | 3.9 | 20 | 18 | 62 | butyl MgCl | 65 | 12.1 |
| n° 4 | 17.3 | 19 | 21 | 28 | 22 | 50 | butyl MgCl | 60 | 2.8 |
| n° 5 | 19.2 | 4.5 | 5.4 | 23 | 23 | 54 | BuLi | 60 | 3.7 |

Method for Copolymerization of Ethylene and Isoprene:

The organometallic complex compound having formula [$(C_{13}H_8)_2SiMe_2$]NdCl as synthesized above is used.

A test is carried out following the method of Example 1.

Table VI below shows the operative conditions and the results obtained for this test.

TABLE VI

| x (mg) | y (ml) | % isoprene in the copolymer | stereochemistry of insertion of the isoprene in the copolymer | | | co-catalyst | t (min) | m (g) |
|---|---|---|---|---|---|---|---|---|
| | | | % 1,2 | % 1,4 | % 3,4 | | | |
| 31.1 | 1 | 2.12 | 1.6 | 21.5 | 76.9 | BuLi + HDiBA | 6 | 4.30 |

EXAMPLE 5
Catalytic System Comprising a Known Organometallic Complex Compound, Corresponding to the Formula $(C_5Me_5)_2NdCl_2Li(OEt_2)_2$ Synthesis of a Salt Having Formula $Li(C_5Me_5)$:

29.9 mmoles of BuLi is added to 29.9 mmoles of $HC_5Me_5$ in heptane at 0° C. The mixture is agitated at ambient temperature overnight. The salt $Li(C_5Me_5)$ thus obtained is then washed, then dried under vacuum.

Synthesis of an Orpanometallic Complex Compound with the Formula $(C_5Me_5)_2NdCl_2Li(OEt_2)_2$:

9.2 mmoles of neodymium trichloride $NdCl_3$ is agitated with reflux overnight in tetrahydrofurane (THF). The suspension thus obtained is lowered to 0° C., then 18.4 mmoles of the salt of formula $Li(C_5Me_5)$ is added. The mixture is agitated overnight with reflux. The THF is then evaporated, then ether is added to the solution obtained. The resulting solution is filtered, then concentrated. Finally, the organometallic complex compound corresponding to the above formula is obtained by crystallization at −30° C.

Method for Copolymerization of Ethylene and Butadiene:

Two tests are carried out following the procedure in Example 1, with the difference being that the compound having formula $(C_5Me_5)_2NdCl_2Li(OEt_2)_2$ is used as the organometallic complex compound.

Table VII below shows the operative conditions and the results obtained with the aforementioned mixture of BuLi and HDiBA as co-catalyst, in molar proportions of lithium butyl/HDiBA/neodymium equivalent to 10/10/1.

1,4 trans (see diagram 1 hereinafter)

1,4 cis (see diagram 2 hereinafter)

1,2 (see diagram 3 hereinafter), and in the form of trans 1,2 cyclohexane rings (see diagram 4 hereinafter).

TABLE VII

| tests | x (mg) | y in monomer mixture | % butadiene in the copolymer | stereochemistry of insertion of the butadiene in the copolymer | | | co-catalyst | t (min) | m (g) |
|---|---|---|---|---|---|---|---|---|---|
| | | | | % 1, 2 | % 1,4 trans | % trans 1,2 cyclohexane | | | |
| n° 1 | 18.7 | 5 | 0.6 | 30 | 70 | 0 | BuLi + HDiBA | 65 | 1.6 |
| n° 2 | 14.4 | 5 | 0.6 | 76 | 24 | 0 | BuLi + HDiBA | 60 | 1.4 |

APPENDIX I

Method for Determining the Microstructure of the Insertions of the Conjugated Dienes in Copolymers of Ethylene and a Conjugated Diene Monomer

NOTATIONS

In all of the diagrams and tables in this Appendix, the following symbols have been used:

T: butadiene or isoprene unit inserted in 1,4 trans,

C: butadiene or isoprene unit inserted in 1,4 cis,

L: butadiene unit inserted in 1,4 cis or trans,

V: butadiene unit inserted in 1,2,

Cy: butadiene unit inserted in a ring,

E: ethylene unit, and

B: butadiene unit.

Concerning the Copolymers of Ethylene and Butadiene:

a) On the Basis of the $RMN^{13}C$ Spectrum:

In order to determine the proportions of the different levels of butadiene in a copolymer, it is necessary to produce an $RMN^{13}C$ spectrum.

In certain cases, this spectrum has lines characteristic of the formation rings, which are shown in Appendix Table 4, hereinafter. It is then not possible to calculate the levels of butadiene simply from the RMNIH spectrum. In fact, the resonances which are obtained from these $RMN^1H$ rings are in the area of the $CH_2$ of the ethylene, and cannot be evaluated separately.

In this specific case, the levels of butadiene are calculated on the basis of determination of the integrals of the lines of the $RMN^{13}C$ spectrum.

For the copolymers of ethylene and butadiene, the butadiene can be inserted in the copolymer chain in accordance with the following four types of insertion:

Diagram 1: Notations Used to Designate the Different Carbons in a Butadiene Unit Inserted in 1,4 Trans, and in Isolated Form in the Copolymer Chain

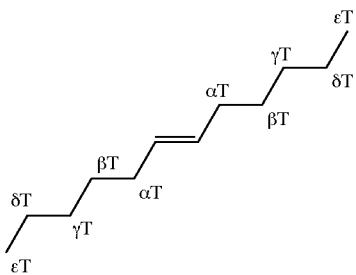

Diagram 2: Notations Used to Designate the Different Carbons in a Butadiene Unit Inserted in 1,4 Cis and in Isolated Form in the Copolymer Chain

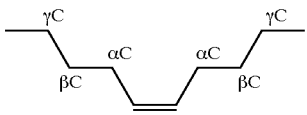

Diagram 3: Notations Used to Designate the Different Carbons in a Butadiene Unit Inserted in 1,2, and in Isolated Form in the Copolymer Chain

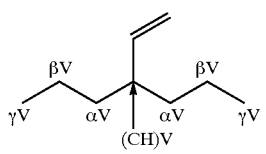

15

Diagram 4: Notations Used to Designate the Different Carbons in a Butadiene Unit Inserted in the Form of Isolated Trans 1,2 Cyclohexane in the Copolymer Chain

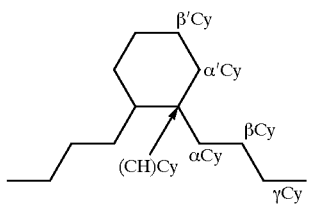

Most of these carbon atoms resonate at a frequency which is specific to them, which does not correspond to the frequency of resonance of the carbon atoms in a polyethylene chain. The following Appendix Tables 1 to 4 summarize the values of the chemical displacements δ for these carbon atoms, and for each of the aforementioned types of insertion.

Appendix Table 1
insertion of the butadiene in 1, 4 cis characteristic chemical displacement

| Integral | Type of carbon | δ (ppm) |
|---|---|---|
| 13 | αC | 27.88 |

Appendix Table 2
characteristic lines of the insertion of the butadiene in 1, 2

| Integral | Type of carbon | δ (ppm) |
|---|---|---|
|  | (CH) V | 44.27 |
| 9 | αV | 35.48 |
| 10 | βV | 27.51 |
|  | γV | 30.22 |

Appendix Table 3
characteristic lines of the insertion of the butadiene in the form of trans (1, 2) cyclohexane

| Integral | Type of carbon | δ (ppm) |
|---|---|---|
|  | (CH) Cy | 42.02 |
|  | αCy | 33.99 |
|  | α'Cy | 32.26 |
|  | γCy | 30.59 |
| 11 | β'Cy | 27.02 |
| 12 | β'Cy | 26.67 |

Appendix Table 4
values of the chemical displacements of the carbons in butadiene units inserted in (1, 4) trans

| Integral | Type of carbon | δ (ppm) |
|---|---|---|
| 1 | γδ TEET |  |
| 2 | γ TEEE |  |
|  | βγ TET |  |
| 3 | δε TEEET |  |
| 4 | δ TEEEE |  |
| 4' | ε TEEEE |  |
|  | βε TEET |  |
| 5 | EE AND β TEEE |  |
| 6 | αδ TET |  |
| 7 | α TEE |  |
| 8 | αβ TT |  |

For these copolymers of ethylene and butadiene obtained according to the present invention, various types of chain formations have been detected by means of the RMN$^{13}$C spectra. These chain formations are illustrated in diagrams 5 to 8 hereinafter. Two letters of the Greek alphabet have been used for naming, against the different carbons of these chain formations.

Diagram 5: Notations Used to Describe the Carbons of a TET Chain Formation

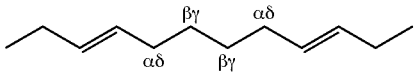

Diagram 6: Notations Used to Describe the Carbons of a TT Chain Formation

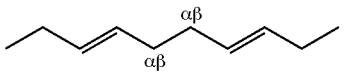

Diagram 7: Notations Used to Describe the Carbons of a TEET Chain Formation

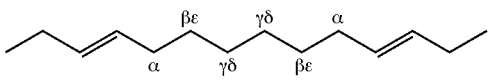

Diagram 8: Notations Used to Describe the Carbons of a TEEET Chain Formation

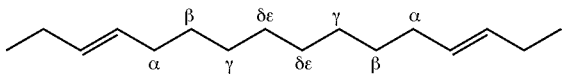

As in the case of the butadiene units inserted in an isolated manner in the copolymer chain, some of the carbons in these chain formations resonate at a frequency which is specific to them. The corresponding values of the chemical displacements are also listed in Appendix Table 4 above (the upper case letters in the column relative to each type of carbon specify the type of chain formation concerned).

The composition of the copolymer has been determined on the basis of the values of the integrals of some of the lines which are listed in Appendix Tables 1 to 4 above. It can be written that:

$T=(6+7+8)/2$ $V=(9+10)/4$ $Cy=(11+12)/4$ $C=13/2$ $2E=$(integral of 26.8 ppm at 31.5 ppm)$+(12+9)/2$.

These values are then transformed into percentages.
b) On the Basis of the RMN$^1$H Spectrum:

When the characteristic lines of rings are absent from the RMN$^{13}$C spectrum, the levels of butadiene inserted in the copolymer can be calculated more accurately and simply from the RMN$^1$H spectrum.

However, this calculation does not make it possible to determine whether the butadiene is inserted in cis or in trans. It simply gives access to the total percentage of butadiene inserted in 1, 4. If, according to the RMN$^{13}$C spectrum, both types of insertions occur, the calculation according to the preceding paragraph must be carried out, in order to determine in which proportions these insertions take place.

Otherwise, the calculation is carried out on the basis of the integrals of certain lines of the spectrum, which are listed in Appendix Table 5. Diagram 8 shows the significance of the term vinyl end.

Diagram 9: Notations Used to Designate the Different Protons

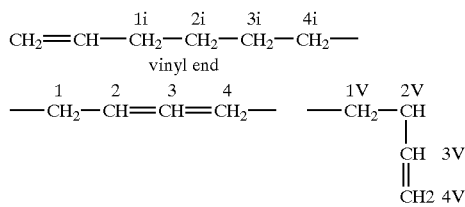

| Integral | δ(ppm) | Type of proton | Number of protons |
|---|---|---|---|
| $I_1$ | 0.87; 0.89 | CH$_3$ at end of chain | |
| | 1.30 | 1 V | 2 |
| | | CH$_2$ of the ethylene | 4 |
| | 2 | 1 + 4 | 4 |
| | | 2 V | 1 |
| | | CH$_2$ in α of a vinyl end | 2 |
| $I_2$ | 4.9 | CH$_2$ = of a vinyl end | 2 |
| | | 4 V | 2 |
| $I_3$ | 5.40 | 2 + 3 | 2 |
| $I_4$ | ≅5.55 | 3 V | 1 |
| $I_5$ | ≅5.75 | CH of a vinyl end | 1 |

Appendix Table 5
characteristic lines in RMN$^1$H of ethylene/butadiene copolymers, as well as of ends of chains It can be written that:

$T$ or $C=I_3\div 2$ $V=I_4$ $E=[I_1-2\times I_3-3\times I_4+4\times I_5]\div 4$ These values can easily be transformed into percentages.
2) Concerning the Copolymers of Ethylene and Isoprene:

In order to determine the proportions of the insertions of isoprene in these copolymers, both the RMN$^{13}$C and RMN$^1$H spectra of the copolymers are produced.

The isoprene can be inserted in the copolymer chain according to four types of insertion, illustrated in diagram 10 below.

Diagram 10: Different Types of Insertion of the Isoprene

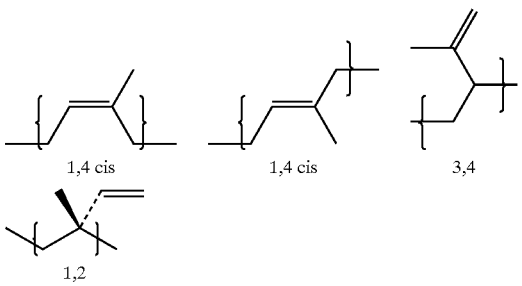

Observation of the RMN$^{13}$C spectrum shows that, in this case, unlike for the copolymers of ethylene and butadiene, rings are not formed.

The levels of insertion in 1,2, 3,4 and 1,4 are determined on the basis of the RMN$^1$H spectrum. Characteristic lines of these insertions are present in the $^1$H spectrum. These are summarized in Appendix Table 6. The notations which are used are described in diagram 11.

Diagram 11: Notations Used to Designate the Different Protons

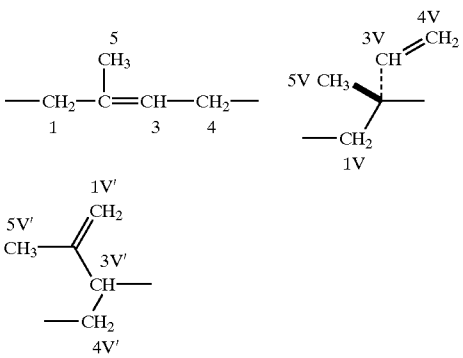

Appendix Table 6
characteristic lines in RMN$^1$H of copolymers of ethylene and isoprene

| Integral | δ in ppm | Type of proton | Number of protons |
|---|---|---|---|
| S5 | 5.6 to 5.8 | 3 V | 1 |
| S3 | 5.05 to 5.25 | 3 | 1 |
| S2 | 4.82 to 5.05 | 4 V | 2 |
| S$_1$ | 4.42 to 4.82 | 1 V' | 2 |
| | 1.99 | 1 + 4 | 4 |
| | | 3 V' | 1 |
| | 1.59 | 5 V' and | 3 |
| | | 5 1,4 trans | 3 |

$1,4=S_3$ $3,4=S_1/2$ $1,2=S_2/2$ $E=$[integral of 0.5 ppm to 2.5 ppm]$-[7*S_3+3*S_1+5*S_5]$ These values are easily transformed into percentages.

The RMN$^{13}$C spectrum makes it possible to determine whether the insertion of the isoprene is in 1,4 cis or 1,4 trans, since characteristic lines of these insertions are present in this spectrum (table 7).

Notation: Insertion in 1,4 Cis (C) or 1.4 (T)

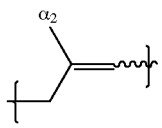

Appendix Table 7
characteristic lines of the insertion of the isoprene in 1, 4

| Integral | Type of carbon | δ(ppm) |
|---|---|---|
| 1 | α$_2$ (cis) | 23.48 |
| 2 | α$_2$ (trans) | 16.05 |

% 1,4 in cis =1/(1+2)

% 1,4 in trans=2/(1+2)

APPENDIX II

Method for Determining of the Statistic of the "Ethylene-butadiene" Chain Formations in the Copolymers of Ethylene and Butadiene Obtained

NOTATIONS tt designates the fraction of TT dyads in a copolymer ee designates the fraction of EE dyads in a copolymer be designates the fraction of BE or EB dyads in a copolymer e designates the fraction of ethylene in a copolymer, and b designates the fraction of butadiene in a copolymer.

According to these definitions, it can be written that:

ee=EE/(EE+BE+TT)

be=BE/(EE+TE+TT)

e=E/(E+B)

b=B/(E+B)

in which:
- TT: is the number of TT dyads in a copolymer, calculated on the basis of the RMN$^{13}$C spectrum
- EE: is the number of EE dyads in a copolymer, calculated on the basis of the RMN$^{13}$C spectrum
- BE: is the number of BE or EB dyads in a copolymer, calculated on the basis of the RMN$^{13}$C spectrum
- E: is the number of ethylene units in a copolymer, calculated on the basis of the RMN$^{13}$C spectrum; and
- T: is the number of butadiene 1,4 trans units in a copolymer, calculated on the basis of the RMN$^{13}$C spectrum.

Determination of the Block Index η for Estimation of the Statistical Structure of the Copolymers For certain copolymers, a line which ischaracteristic of the presence of TT dyads appears in the RMN$^{13}$C spectrum. Its value is given in table 4 of appendix I.

For the copolymers where η has not been calculated, the butadiene units are isolated in the chain.

The block index is defined by the ratio:

η=(be)/(be)$_{statistical}$ in which (be) represents the reaction of BE or EB dyads in the copolymer analyzed, and (be)$_{statistical}$ represents the fraction of BE or EB dyads in a'statistical copolymer with the same composition.

For a homogeneous statistical copolymer, (be)$_{statistical}$=2.e.b is obtained, and the block index η can then be written as:

η=(be)/(2. e.b).

For a given copolymer, the block index η provides information on the structure of this copolymer only if it is compared with a perfectly alternating block index η$_{alternating}$, with the same composition, in the copolymer. By definition, when b<e (which is the case for all the copolymers according to the invention), the following is obtained:

η$_{alternating}$=1/e.

In order to determine η and η$_{alternating}$, it is therefore necessary to know b, e, ee, tt and be, as well as B, E, EE, BB and BE. The values of these last parameters can be calculated on the basis of some of the integrals of the lines of the RMN$^{13}$C spectrum (see Appendix I), which integrals appear in the following equations:

The following is obtained:

BE=(1+2+6+7)/2+13+9+11

2BB=8

2B=6+7+8+(9+10)/2+(11+12)/2+13

2E=[integral of 26.8 ppm to 31.5 ppm]+(12+9)/2−13

EE=E−(BE)/2

Conclusion on the Statistics of the Ethylene/butadiene Chain Formations

The lower η is, the more the copolymer will have a block tendency.

The closer η is to η$_{alternating}$, the more the copolymer will have a tendency to alternance.

We claim:

1. Catalytic system for polymerization, comprising:
   an organometallic complex compound, which is represented by one of formula A or B:

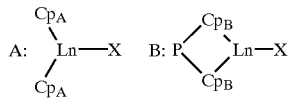

in which Ln represents a metal of a lanthanide, the atomic number of which is between 57 and 71;

X represents a halogen selected from the group consisting of chlorine, fluorine, bromine and iodine; wherein
   in formula A, two ligand molecules CP$_A$, each a substituted cyclopentadienyl group having the formula (C$_5$H$_4$)(SiMe$_3$), in which Me is methyl, are bonded to metal Ln; and
   in formula B, a ligand comprising two Cp$_B$ molecules, bonded to one another by a bridge P, is bonded to metal Ln, wherein $Cp_B$ is a substituted cyclopentadienyl having $(C_5H_4)(SiMe_3)$, in which Me is methyl, or an unsubstituted fluorenyl group having the formula $C_{13}H_8$ and P corresponds to formula $MR_2$, in which M is an element in column IVA of Mendeleev's periodic classification, and R is an alkyl group having 1 to 20 carbon atoms; and a co-catalyst selected from the group consisting of a magnesium alkyl, a lithium alkyl, an aluminium alkyl, a Grignard's reagent, and mixtures thereof.

2. The catalytic system according to claim 1, wherein the organometallic complex compound is represented by formula A.

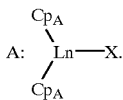

3. The catalytic system according to claim 1, wherein the organometallic complex compound is represented by formula B.

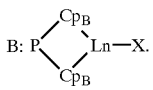

4. The catalytic system according to claim 3, wherein the M of bridge P is silicon.

5. The catalytic system according to claim 1, where metal Ln is neodymium.

6. The catalytic system according to claim 1, wherein the co-catalyst is selected from the group consisting of magnesium butyloctyl, lithium butyl, aluminium diisobutyl hydride, magnesium butyl chloride, and mixtures thereof.

7. The catalytic system according to claim 1, wherein the co-catalyst comprises a mixture of an aluminium alkyl and a lithium alkyl, which are present in substantially stoichiometric quantities in the mixture.

8. Method for preparing a catalytic system comprising an organometallic complex compound, which is represented by one of formula A or B:

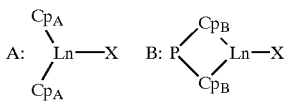

in which Ln represents a metal of a lanthanide, the atomic number of which is between 57 and 71;

X represents a halogen selected from the group consisting of chlorine, fluorine, bromine wherein in formula A, two ligand molecules $CP_A$, each a substituted cyclopentadienyl group, are bonded to metal Ln;

and in formula B, a ligand comprising two $Cp_B$ molecules, bonded to one another by a a bridge P, is bonded to metal Ln, wherein $Cp_B$ is a substituted or unsubstituted cyclopentadienyl or fluorenyl group and P corresponds to formula $MR_2$, in which M is an element in column IVA of Mendeleev's periodic classification, and R is an alkyl group having 1 to 20 carbon atoms; and a co-catalyst selected from the group consisting of a magnesium alkyl, a lithium alkyl, an aluminium alkyl, a Grignard's reagent, and mixtures thereof, the method comprising preparing the organometallic complex compound by a) reacting a hydrogenated molecule of a ligand represented by formula HCp, with a lithium alkyl to obtain a lithium salt;

b) reacting the lithium salt in a complexing solvent with an anhydrous anthanide trihalide, represented by formula $LnX_3$, in which X represents a halogen selected from the group consisting of chlorine, fluorine, bromine and iodine to produce a reaction product;

c) evaporating the complexing solvent and extracting the reaction product of b) in a non-complexing solvent to produce an extracted reaction product, and, optionally;

d) crystallizing the extracted reaction product of c) to obtain the organometallic complex compound, which is completely free from the said complexing solvent; and adding the co-catalyst selected from the group consisting a magnesium alkyl, a lithium alkyl, an aluminium alkyl, a Grignard's reagent, and mixtures thereof to the organometallic complex compound.

9. The method for preparation of a catalytic system according to claim 8, wherein the lithium alkyl is lithium butyl.

10. The method for preparation of a catalytic system according to claim 8, wherein the complexing solvent is tetrahydrofuran.

11. The method for preparation of a catalytic system according to claim 8, comprising reacting two moles of the lithium salt with one or two moles of the lanthanide trihalide.

12. The method for preparation of a catalytic system according to claim 8, wherein the non-complexing solvent is toluene or heptane.

* * * * *

UNITED STATES PATENT AND TRADEMARK OFFICE
CERTIFICATE OF CORRECTION

PATENT NO.        : 6,569,799 B1
APPLICATION NO. : 09/689464
DATED             : May 27, 2003
INVENTOR(S)       : Barbotin et al.

It is certified that error appears in the above-identified patent and that said Letters Patent is hereby corrected as shown below:

On the title page item (56) References Cited, OTHER PUBLICATIONS: Under Cui, Li Qiang et al., "Prelominary" should read -- Preliminary --

On the title page item (56) References Cited, OTHER PUBLICATIONS: Under Hongze Liang et al., "$MeC_6H_5$)" should read -- $MeC_6H_5$ --

On the title page item (56) References Cited, OTHER PUBLICATIONS: Under Paulo Biagini et al., "$(AIX_3R)_3$" should read -- $(AlX_3R)_3$ --

On the title page item (57) ABSTRACT, line 1: "to" should be deleted

On the title page item (57) ABSTRACT, formulae: " A:' " should read -- A: --; and " B': " should read -- B: --

Column 1, line 41: "$C_{pn}$" should read -- $Cp_n$ --

Column 1, line 48: "tetrahydrofurane" should read -- tetrahydrofuran --

Column 1, line 61: "formula:" should read -- formulae: --

Column 3, line 38: "A," should read -- A', --

Column 3, line 41: "B," should read -- B', --

Column 4, line 29: "tetrahydrofurane" should read -- tetrahydrofuran --

Column 5, line 32: "Lima" should be deleted

Column 5, line 33: "$\{[C_5H_3)SiMe_3]_2$" should read-- $\{[(C_5H_3)SiMe_3]_2$ --

Column 6, line 10: "tetrahydrofurane" should read -- tetrahydrofuran --

Column 9, line 39: "altemance" should read -- alternance --

Column 10, line 56: " "ethylenie-butadiene" " should read -- "ethylene-butadiene" --

Column 11, line 24: "MMoles" should read -- mmoles --

Column 11, line 52: "Orpanometallic" should read -- Organometallic --

UNITED STATES PATENT AND TRADEMARK OFFICE
CERTIFICATE OF CORRECTION

PATENT NO. : 6,569,799 B1
APPLICATION NO. : 09/689464
DATED : May 27, 2003
INVENTOR(S) : Barbotin et al.

It is certified that error appears in the above-identified patent and that said Letters Patent is hereby corrected as shown below:

Column 12, line 55: "Orpanometallic" should read -- Organometallic --

Column 12, line 57: "tetrahydrofurane" should read -- tetrahydrofuran --

Column 13, line 56: "RMNIH" should read-- $RMN^1H$ --

Column 19, line 65: "ischaracteristic" should read -- is characteristic --

Column 20, line 8: "a'statistical" should read -- a statistical --

Column 20, line 62: "$CP_A$," should read -- $Cp_A$, --

Column 21, line 52: "bromine wherein" should read -- bromine and iodine; wherein --

Column 22, line 1: "$CP_A$," should read -- $Cp_A$, --

Column 22, line 4: "a" (second occurrence) should be deleted

Column 22, line 20: "anthanide" should read -- lanthanide --

Column 22, line 34: "a" (first occurrence) should read -- of a --

Signed and Sealed this

Twenty-fourth Day of July, 2007

JON W. DUDAS
*Director of the United States Patent and Trademark Office*